United States Patent [19]

Maekawa et al.

[11] 4,137,622
[45] Feb. 6, 1979

[54] METHOD OF PREPARING A SUPPORT

[75] Inventors: Minoru Maekawa, Yokohama; Makoto Kurobe, Mito, both of Japan

[73] Assignee: Sekisui Jushi Kabushiki Kaisha, Osaka, Japan

[21] Appl. No.: 861,556

[22] Filed: Dec. 16, 1977

[30] Foreign Application Priority Data

Dec. 17, 1976 [JP] Japan .......................... 51-152554

[51] Int. Cl.² ........................................... B23P 17/00
[52] U.S. Cl. ................................... 29/411; 29/417; 29/429; 29/451; 29/460; 29/525; 47/47
[58] Field of Search ................ 29/417, 411, 429, 451, 29/460, 525; 47/47

[56] References Cited

U.S. PATENT DOCUMENTS

| | | | |
|---|---|---|---|
| 3,095,641 | 7/1963 | Siegel | 29/411 |
| 3,109,231 | 11/1963 | Johnson | 29/411 |
| 3,241,224 | 3/1966 | Banister et al. | 29/429 |
| 3,368,271 | 2/1968 | Scheffler | 29/411 |
| 3,530,565 | 9/1970 | Lanza et al. | 29/429 X |
| 3,550,269 | 12/1970 | Yatabe et al. | 29/460 X |
| 3,733,677 | 5/1973 | Laeffler et al. | 29/411 |
| 3,740,811 | 6/1973 | Kozusnik | 29/417 X |
| 3,829,958 | 8/1974 | Roseby | 29/460 |

Primary Examiner—Charlie T. Moon
Attorney, Agent, or Firm—Armstrong, Nikaido, Marmelstein & Kubovcik

[57] ABSTRACT

A support and a process for preparing the support are disclosed. The support includes a metal pipe having two ends, a pair of plugs and a covering tube. The plugs are positioned in each end of the metal pipe and are formed from a thermoplastic resin. The plugs each include an outer portion having an outside diameter that is equal to the outside diameter of the metal pipe. The covering tube is formed from a thermoplastic resin that is compatible with the thermoplastic resin forming the plugs. The covering tube covers and closely contacts the entire outer surface of both the metal pipe and the outer portions of the plugs.

5 Claims, 14 Drawing Figures

METHOD OF PREPARING A SUPPORT

BACKGROUND OF THE INVENTION

1. Field of the Invention

This invention relates to a support, more particularly a support for use in agriculture and fisheries, and also to a process for preparing the support.

2. Description of the Prior Art

A support, especially a support for use in agriculture and fisheries, should preferably not only endure weathering but also have sufficient strength and light weight. When a support is viewed from the standpoint of strength, it is preferably made of metal such as iron, and when viewed from the standpoint of weight, it is preferably made of hollow article, as for example, a pipe. A metal pipe, however, is liable to rust and corrode when exposed to the weather and is not fit for use for over an extended period of time. Thus, a resin covered support has been used comprising a metal tube and a synthetic resin tube covering the metal tube.

A resin covered support still has a drawback. The drawback is that the resin covered support is liable to be corroded from the inner surface thereof, because the resin covered tube is commonly prepared by covering the metal tube with the resin only on the outer surface thereof. Attempts were then made to prepare a resin covered support having the inner surface of the support covered with an anticorrosive coating or the resin. These attempts, however, were not successful, because the resulting supports were either hard to manufacture or were not sufficiently resistant to rusting.

The inventors noticed the above facts and aimed to provide a support which is free from the drawbacks mentioned above. The inventors have found that a support can be obtained which does not allow water to enter the inside thereof, and which can also withstand weathering by fitting a plastic plug in each end of a metal pipe having a given length. The plug is formed having an outside diameter that is identical with that of the metal pipe, and the resulting pipe is covered with a plastic tube that forms a close contact between the covering tube and the plug. The present invention has been completed on the basis of such findings.

SUMMARY OF THE INVENTION

According to the present invention a support is provided which comprises a metal pipe; two plugs of a thermoplastic resin fitted in each end of the metal pipe, each plug having an outside diameter identical with that of the metal pipe; and a tube made of a thermoplastic resin compatible with the plug resin and covering the entire outer surfaces of both the pipe and the plugs, the tube being in close contact with the surfaces.

The support is preferably provided with a rugged outer surface, because twining plants, such as ivy and vine, can more easily entangle with the support when the support is provided with a rugged outer surface. Conversely, it is difficult for the plants to entangle with the support when it has a smooth surface, since the surface is formed from a thermoplastic resin. The rugged surfaces in this instance can be roughly classified into two groups; one of which is a surface having annular projections similar to bamboo joints, and the other is a surface having linear projections extending in the longitudinal direction. Preferably these projections are further provided with a number of small recesses arranged in the longitudinally extending direction of the projections.

The support has a plug at each end thereof, which plug is preferably tapered into a sharp point when intended for use in agriculture. Commonly, the sharp point can take one of two forms. One of the forms is a conically tapered end. This conical end is prepared by fitting a plug into a support end and shaving the plug end into a conical form. The other form is provided by simply cutting the support end at a slant.

The inventors tried a number of experiments in order to determine an efficient method for forming a support in which a plug of synthetic resin is fitted in both ends of a metal pipe, and the resulting pipe is covered with a resin tube to form the support. As a result of these experiments, the inventors determined that the most convenient process is one in which the metal pipes and the resin plugs are alternately arranged one after another so that the plug axis may be located on the extension line of the pipe axis, the pipes and the plugs being connected to each other to form a continuum, which is then introduced into a die mounted on an extruder, from which a resin tube is extruded around the continuum, thus covering the continuum with the resin tube. Further, the inventors determined that it is desirable to cut the resulting covered continuum precisely at the location wherein the resin plug is present in the covered continuum. This invention has been completed on the basis of such confirmation.

According to one aspect of the present invention, a process for preparing a support is provided which comprises taking metal pipes one by one from a pile of metal pipes wherein all of the pipes have their longitudinal axes lying in parallel relation to each other and to a passage taking resin plugs one by one from a supply of resin plugs stored in a location transverse to the passage, placing the pipe and the plug in the passage with their axes in common, intermittently transferring the pipe in the axial direction thereof to interpose the plug in the intervals between the pipes, inserting each end of the plug into corresponding ends of the forward and rearward pipes to form a continuum having a uniform outside diameter, feeding the continuum into a crosshead die mounted on an extruder, covering continuously the continuum with a synthetic resin, and cutting the thus covered continuum at the portion where the plug is present.

DESCRIPTION OF THE PREFERRED EMBODIMENT

Figure 1:
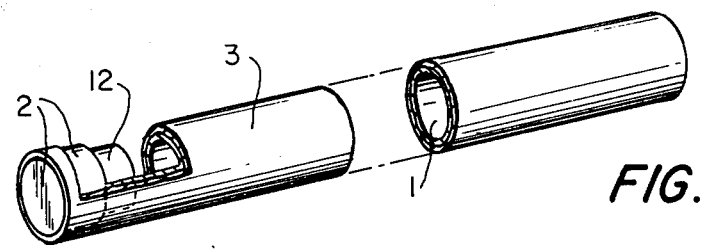
FIG. 1 is a perspective view, partly in section, of a support of the present invention.

Particularly, FIG. 1 is a perspective view of a support, partly cut away, in which neither end is sharpened. In FIG. 1, the support comprises a metal pipe 1, a plug 2 of thermoplastic resin inserted into both ends of the metal pipe 1 to form a closed hollow article having a uniform outside diameter, and a covering tube 3 of thermoplastic resin in close contact with the hollow article. Plug 2 has at one end thereof a portion 12 of a smaller diameter, which is inserted to closely contact the inner wall of metal pipe 1. The plug 2 is secured to the end of metal pipe by inserting the portion 12 into the metal pipe 1. The remaining portion of the plug 2, that is, all except portion 12, has an outside diameter equal to that of metal pipe 1. Thus, when the plugs 2 are secured to both ends of metal pipe 1 to form the closed hollow article, the article has a uniform outside diameter, and when the article is covered with the resin tube 3, the resin tube 3 is in close contact with both the metal pipe 1 and the plug 2 to form a flat outer surface without the formation of any discontinuity at the joint between the metal pipe 1 and the plug 2.

The metal pipe 1 preferably has a length between 900 and 4000 mm, an outside diameter between 7 and 40 mm, and a thickness between 0.3 and 0.8 mm. Most preferably the length is about 2000 mm, the outside diameter is between 16 and 24 mm and the thickness is about 0.4 mm. The metal pipe 1 is preferably made of iron. Metal pipe 1 may be made of copper, aluminum, duralmin, brass, stainless steel, etc. In addition, the metal pipe 1 is not limited to a pipe of annular cross section, but may be of polygonal or elliptical form.

The plug 2 is preferably formed of a resin, which should be compatible with a resin forming the covering tube 3. In this instance, when resin tube 3 is extruded around plug 2, tube 3 is closely contacted with the plug 2 to form an integrated product. Use is preferably made of homopolymers or copolymers containing a compatible monomer for the resins. In particular, polyvinyl chloride, polypropylene, polyethylene, ethylene-vinyl chloride copolymer, ABS-resin, cellulosic resin, polyamide, polystyrene and the like can be used for the resin. The plug 2 is preferably provided with the portion 12 having an outside diameter smaller than the outside diameter of metal pipe 1 by just two times the thickness of metal pipe 1. Preferably, the portion 12 is provided with a slight taper. The smaller diameter portion 12 preferably has an axial length ranging from one to several cm and the plug 2, excluding the smaller diameter portion 12, also has an axial length ranging from one to several cm. The plug 2 is preferably provided with a larger diameter portion at the center thereof and two smaller diameter portions 12 at both sides of the larger diameter portion. The larger diameter portion has an axial length of about 3 cm and the smaller diameter portion each have an axial length of about 2 cm, thus the total axial length of the plug is about 7 cm. Resin tube 3 should have a thickness of more than one tenth mm, and preferably the thickness is between 0.3 and 1 mm.

Figure 2:
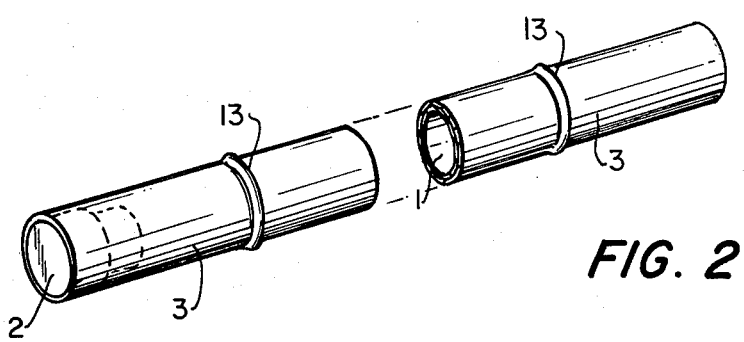
FIG. 2 is a perspective view of a support having a plurality of annular projections.

FIG. 2 shows a support provided with a number of annular projections on the outer surface of resin tube 3.

In FIG. 2, 13 denotes the projections, which are formed on the outer surface of resin tube 3. The projections 13 are of annular configuration and are positioned perpendicular to the longitudinal axis of the resin tube 3. The projections 13 are made of a resin identical with resin tube 3, and are adhered to the resin tube 3 to form an integral structure. The annular projections 13 are preferably spaced at distances of 10 or more cm. Further, the annular projections 13 are preferably formed having an angular cross-sectional shape and a height between one and several mm.

Figure 3:
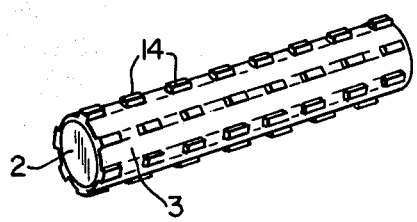
FIG. 3 is a perspective view of a support having a plurality of linear projections.

FIG. 3 shows a support provided with several linear projections 14 on the outer surface of the resin tube 3. The linear projections 14 are formed in six lines extending in the axial direction of the support. Each of the linear projections comprises a number of small projections separated in the axial direction of the support. Projections 14 are formed of a resin material identical with the resin material forming the tube 3 and the projections are firmly adhered to the tube 3 to form an integral structure.

Figure 4:
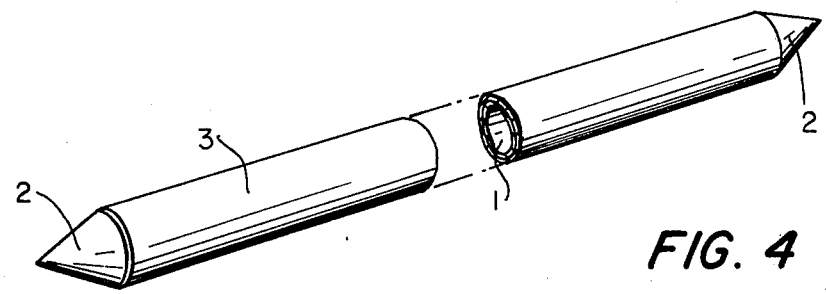
FIG. 4 is a perspective view of a support provided with a conical end.

FIG. 4 shows a support provided with conically sharpened ends 2 at both extremities of the support. In this instance, the annular projections 13 are preferably absent from the outer surface in the vicinity of the plugs 2, and the plugs 2 preferably have a somewhat longer axial length in order to prevent the metal pipe from being exposed to the outside when the plugs are sharpened.

Figure 5:
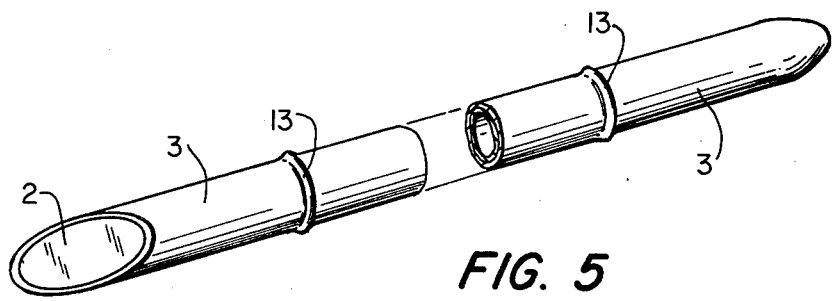
FIG. 5 is a perspective view of a support having its ends cut on a slant.

FIG. 5 shows a support, both ends of which are cut by a slanted flat plane at the plug 2 to form a sharpened extremity. The sharpened extremity may be prepared by cutting the support at the plug 2 as shown in FIG. 1. In this instance, it is also preferable to provide the plug 2 with a length sufficient to avoid exposure of the metal pipe 1 when the support is obliquely cut at the plug 2.

Figure 6:
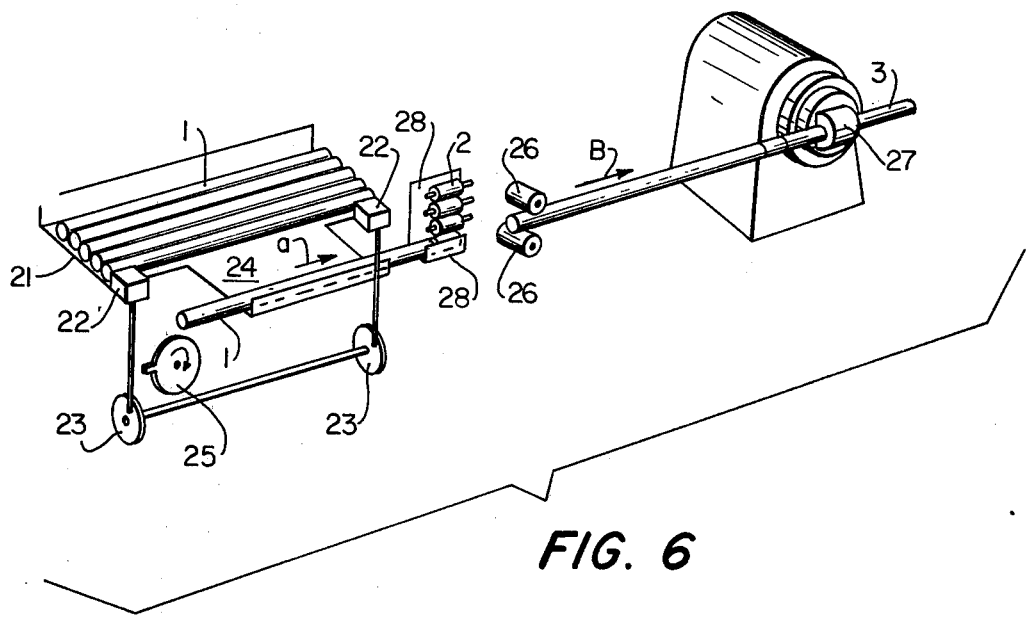
FIG. 6 is a schematic perpsective view of an apparatus for carrying out one method of the present invention.

FIG. 6 shows an embodiment of a process according to the present invention, in which it is ensured that metal pipe 1 and resin plug 2 are alternately arranged and connected one after another to form a continuum, which continuum is in turn fed into a cross-head die mounted on an extruder. A number of metal pipes 1 are piled on slant plate 21 with their longitudinal axes lying in a parallel relation to each other. The piled pipes are held by movable stoppers 22. When the stoppers 22 are lowered by means of rotating cams or discs 23, the piled pipes are transferred intermittently to passage 24 one by one. A cam 25 is located at the extension of the passage 24, and metal pipes 1 on the passage 24 are pushed in the direction of arrow a by a protrusion on cam 25. Thus, the metal pipes are advanced and interposed between paired rollers 26, which further advance the metal pipes to a cross head die 27 mounted on the extruder.

Plugs 2 are supplied to passage 24 one after another from a direction transverse to metal pipes 1. Plugs 2 are initially piled one above another with their axes turning in parallel to the axes of metal pipes 1, and with the lowest plug 2 in contact with the metal pipe 1 in the passage 24. A holder 28 is provided to form a part of the passage wall and it holds the plug 2 in the passage 24. When the metal pipe 1 is absent from holder 28, plug 2 falls to the bottom of holder 28 and is positioned in front of the metal pipe to be subsequently conveyed to holder 28. Since the plug 2 has an outside diameter equal to that of the metal pipe 1, when a vertical wall having a size just permitting only one metal pipe to pass through the blocking passage 24 is provided at the forward end of holder 28, only one plug can be passed through the wall and is advanced together with the metal pipe 1, when the metal pipe 1 is pushed in the direction of arrow a by the protrusion of cam 25. At this time, if the plug 2 is provided with a smaller diameter portion, then the smaller diameter portion is fitted into the end of metal pipe 1 and plug 2 is connected with metal pipe 1 without difficulty.

The metal pipe 1 is pushed by the protrusion of cam 25 at an advancing rate a, which is faster than the rate b at which the metal pipe is advanced by the pair of pinching rollers 26. Thus, when advanced by the protrusion of cam 25, metal pipe 1 catches up with the preceding metal pipe and contacts the preceding metal pipe. If the plug 2 is also provided with a smaller diameter portion at its forward end, the portion is also fitted into the rear end of the preceding metal pipe to form a continuum. The continuum is pinched by the paired rollers 26 and gradually advances towards the crosshead die 27.

Since the plug 2 has an outside diameter equal to that of the metal pipe 1, when the plug 2 is alternately connected with metal pipes 1 to form the continuum, the continuum has an equal diameter at every portion. Thus, the continuum acts as if it were a metal pipe having a uniform outside diameter. The continuum, therefore, is suited for carrying out an extrusion covering. That is, if a resin tube is extruded to cover the continuum, the resin tube 3 makes a tight cover around the continuum. Extrusion of the resin tube in this case can be carried out without difficulty by applying thereto the conventional operations for preparing electric wires in which the metal wires are covered with the resin.

Figure 8:
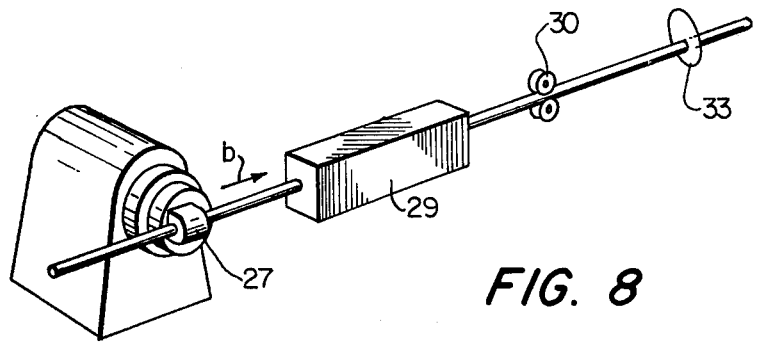
FIG. 8 is a diagramatic perspective view of a cooling apparatus of the present invention.

The extruded, resin-covered continuum is then cooled by cooling means 29 positioned forward of the die 27, as shown in FIG. 8. Subsequently, the continuum is pinched by take-up rollers 30 and taken out. Cooling may be carried out by blowing air, and is most preferably carried out by contact with water. After being taken out, the continuum is cut by a saw at a predetermined position.

According to an apparatus as shown in FIG. 8, since the extruder always extrudes a predetermined amount of the resin, the resulting resin tube has a uniform thickness, so long as the take-up rollers 30 are rotated at a constant speed and the resin tube is taken out at a constant rate. Thus, according to the present method, a support is obtained, as shown in FIG. 1, which has no projections on the outer surface thereof. If, however, take-up rollers 30 are stopped from rotating for a short period of time, for example for several seconds, the extruded resin is heaped to form a locally thick portion. This thick portion forms an annular projection at the exit of the die. When the take-up rollers are then again rotated, the extruded resin is turned again into a covering tube 3 having the same thickness as before. Height and length of the thick portion can be controlled by the period of time the take-up rollers 30 are stopped and by the amount of resin extruded from the extruder. Thus, a support can be obtained having spaced annular projections on the outer surface thereof, as shown in FIG. 2.

Figure 9:
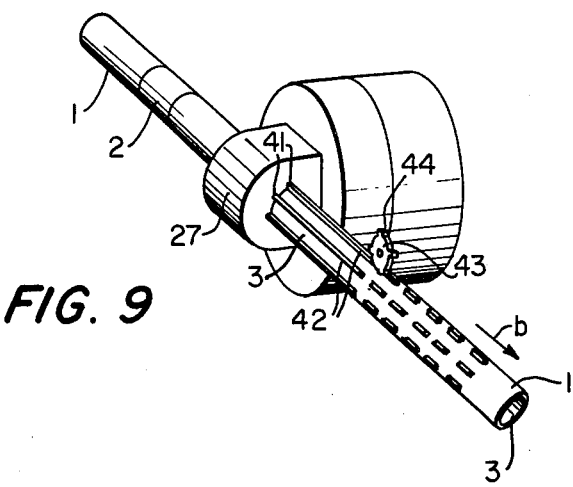
FIG. 9 is a diagramatic perspective view of a crosshead die of the present invention.

A support having projections of the type shown in FIG. 3 can be prepared by the process described below. In FIG. 9, cross-head die 27 is mounted on an extruder. The die 27 is provided with spaced checks 41 on the wall of the resin passage in the vicinity of the exit. The checks 41 provide the extruded resin tube with linear projections 42 projecting outwardly on the surface thereof and extending in the axial direction of the tube. Each of rollers 43 is located at a small distance from die 27 so as to press each of the linear projections 42. Each roller 43 is provided with jagged periphery 44. Since the resin tube is still in a softened state when it passes through the rollers 43, each linear projection is locally pressed by the jagged periphery 44 of each roller 43 to thereby form a number of small projections separated in the axial direction of the tube. Though only one roller 43 is shown in FIG. 9, other similar or identical rollers are provided for each linear projection 42. As a result, a support can be obtained, as shown in FIG. 3, having a number of small projections.

Thus, a covered continuum can be obtained having a uniform outer surface in every portion except the projections, especially when viewed in the longitudinal direction of the tube. In other words, resin tube 3 neither has a tier nor a recess at the joint between metal pipe 1 and plug 2. Thus, after the continuum has been covered with resin tube 3, special consideration is required to locate the positions to be cut, because the continuum must be accurately cut at the positions where plug 2 is present in order to produce supports having both ends closed by plug 2.

The present invention provides a method for accurately cutting the covered continuum at the positions where plug 2 is present, even though it is not possible to locate these positions by the naked eye from the outside after the covering has been carried out. The present invention adopts the procedures in which electro-magnetic waves are applied to the covered continuum, variations in the applied electro-magnetic waves are detected to find the position where a plug is present, and the covered continuum is cut at these detected positions. In general, the resin has electro-magnetic properties different from the metal. An electro-magnetic wave transmitting apparatus is paired with a receiving apparatus which can detect variations in the electro-magnetic waves. The covered continuum is allowed to approach the paired apparatus and the covered continuum indicates different sensitivities between the portions in which metal pipe 1 is present and the portions in which plug 2 is present, and thus the position in which plug 2 is present can be detected. In the present invention, the covered continuum is cut at the positions where plug 2 is present on the basis of principles discussed above.

Figure 7:
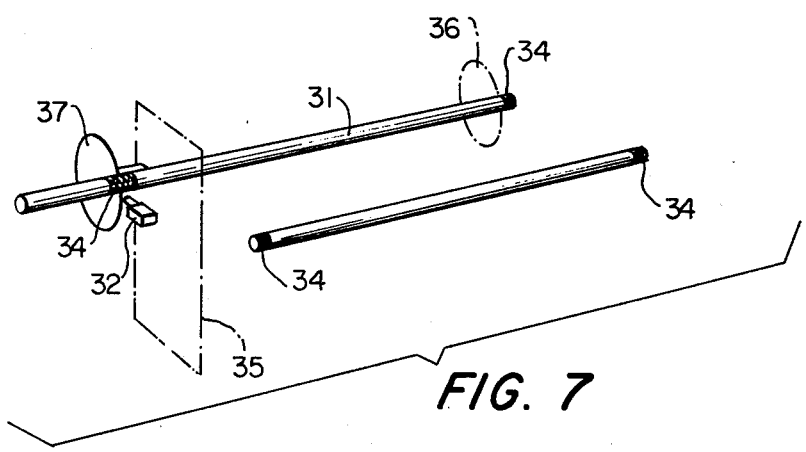
FIG. 7 is a diagramatic perspective view of a position sensing and cutting apparatus of the present invention.

The electro-magnetic wave transmitting and receiving apparatus discussed above is available in the market. The paired sets are called a position sensing switch, which are manufactured and sold by Fuji Denki Seizo Kabushiki Kaisha in Japan under the name "Fuji Kinsetsu Switch". FIG. 7 shows a cutting apparatus provided with such a position sensing switch. In FIG. 7, reference numeral 31 denotes a covered continuum, 32 a position sensing switch, 33 a saw, 34 a portion where the plug 2 is present, 35 is a circuit that connects the position sensing switch 32 with a saw 33. When the portion 34 containing plug 2 is advanced to the position sensing switch 32, the position sensing switch perceives a variation in the electro-magnetic waves and send a signal to the circuit 35 which in turn supplies electric current for rotating and advancing the saw 33 towards covered continuum 31 from a direction lateral to the continuum, and as a result, the continuum 31 is cut at the position where plug 2 is present therein.

FIG. 7 shows an embodiment of the cutting means, wherein the continuum 31 is cut by the saw 33 located in the vicinity of position sensing switch 32. However, the saw 33 may be positioned at a location distant from position sensing switch 32. For example, the saw 33 may be located at the distance of the support length from the position sensing switch. That is, saw 33 may be located at the position indicated by a dotted line 36 in FIG. 7. In either case, the plug 2 is accurately cut at the position where plug 2 is present by use of a position sensing switch.

Figure 10:
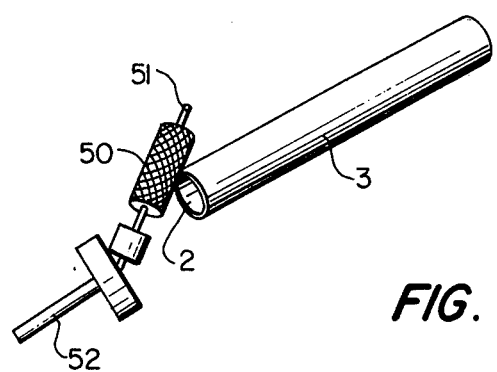
FIG. 10 is a diagramatic perspective view of an end filing device of the present invention.
Figure 11A:
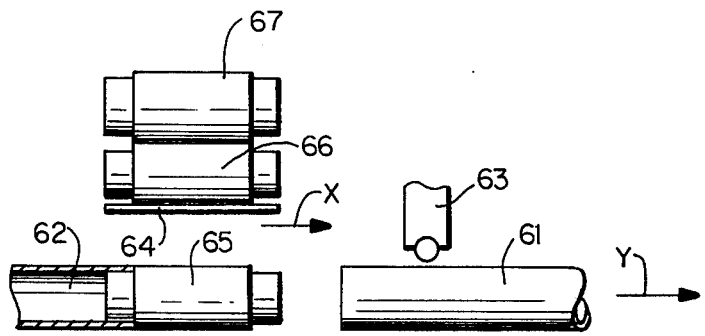
FIGS. 11a-d are diagramatic elevational views of the steps of a method of the present invention.
Figure 11B:
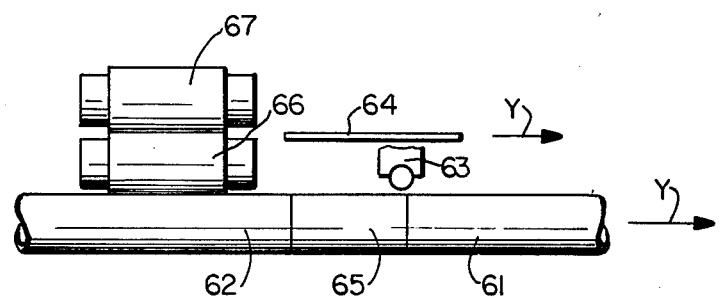
Figure 11C:
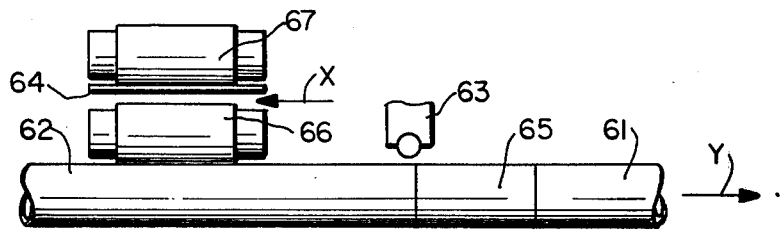
Figure 11D:
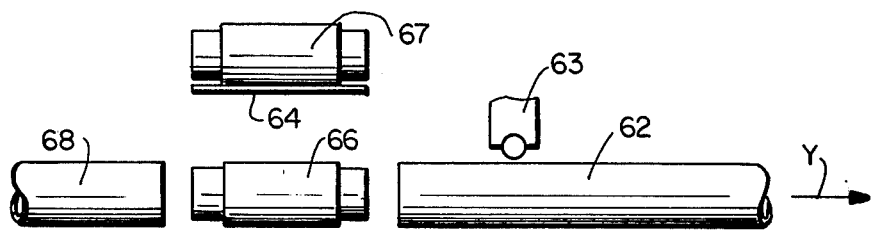

A support having sharp ends at both extremities as shown in FIGS. 4 and 5 is prepared in the below-discussed manner. A support having conically sharpened ends as shown in FIG. 4, is prepared by the steps in which a support is at first prepared having both ends cut by a flat plane perpendicular to the axis of the support, as shown in FIG. 1. The support is then shaved off at both ends to form conically sharpened ends, as shown in FIG. 4. In order to shave off the support ends, as shown in FIG. 10, it is convenient to obliquely apply a roller 50 having a file surface to the end of support 3, while the roller 50 is being rotated around the axis 51 and further revolved around the support 3 by revolving axis 51 around axis 52.

A support having its ends cut on a slanted flat plane, as shown in FIG. 5, can be obtained without difficulty by obliquely applying a saw to the support which originally has its ends cut perpendicularly to the axis of the support, as shown in FIG. 1, and by then rotating the saw to cut the ends. The support shown in FIG. 5 may also be obtained by obliquely applying a saw when the covered continuum is cut to a predetermined length.

FIG. 11 illustrates a method which may be utilized in order to ensure that a resin plug is located at the end of a metal pipe. FIG. 11 shows the method schematically in which the plug is fitted in the metal pipe through four steps (a) to (d).

Particularly, in the first step (a), a preceding metal pipe 61 is advanced in the direction indicated by arrow y, and a succeeding metal pipe 62 accompanying plug 65 is advanced also in the direction y to chase the preceding pipe 62. In this method, plug 65 is succeeded by plugs 66 and 67, which are stored in a heaped state in a transverse direction transverse to plug 65 and separated from plug 65 by a separating plate 64. The separating plate 64 is designed to be able to move in the horizontal direction indicated by arrow x by means of a position sensing switch 63. Separating plate 64 is located at a height such that two plugs 65 can be placed under the plate, while however, three plugs 65 cannot be placed under the plate.

Step (b) in FIG. 11 shows the state wherein succeeding metal pipe 62 is conveyed in the direction of y to catch up with the preceding metal pipe 61. At this time, position sensing switch 63 perceives variation in the electro-magnetic waves from metal pipe 61 and resin plug 65, and moves the separating plate 64 in the direction indicated by arrow y. When plate 64 is moved, plugs 66 and 67 fall in a piled relation, until plug 66 is in contact with and riding on the succeeding metal pipe 62.

Step (c) in FIG. 11 shows the state wherein the succeeding metal pipe 62 is further transferred in the direction y together with the preceding metal pipe 61, and the position sensing switch 63 perceives the variation in electromagnetic waves from resin plug 65 and metal pipe 62. When the position sensing switch 63 perceives the variation, the position sensing switch 63 moves separating plate 64 in the direction of arrow x in step (c), and elevates the plug 67 and the following plugs, leaving plug 66 alone under the plate 64.

Step (d) in FIG. 11 shows the state wherein the succeeding metal pipe 62 is further conveyed in the direction y until metal pipe 62 is absent from underneath of separating plate 64. In this state, position sensing switch 63 still perceives metal pipe 62 and the separating plate 64 is still holding plug 67 and the following plugs that lie above plug 67. When the rear end of metal pipe 62 has passed underneath the separating plate 64, the resin plug 66 riding on metal pipe 62 falls into the passage where succeeding metal pipe 68 is to be advanced. When succeeding metal pipe 68 is further advanced in the direction y, the rear end of resin plug 66 is fitted in the forward end of succeeding metal pipe 68, and the step (a) discussed above is repeated. By repeating the steps (a) to (d) in this order, the resin plugs and metal pipes are alternately placed and connected to form a continuum which is further transferred.

The support according to the present invention is a structure that has a resin plug fitted at both ends of a metal pipe to form a core, which is covered with a resin tube to form an integrated article that, therefore, does not expose the metal pipe to the outside. Since the resin plug is composed of a resin that is compatible with the resin forming the covering tube, the covering tube is closely contacted with the plug, and the inside of the metal pipe is kept watertight. Thus, the support has the strength of a metal pipe, but will not rust or corrode. Especially, since the inside is kept watertight, the support is excellent in that it will not corrode from the inside. Further, when the support is provided with projections on the outer surface thereof, the support has the additional advantages that twining plants such as ivy and vine can clasp the support and twine themselves around the support without difficulty, and further, a string or a rope can be attached to the support surface at a desired position when the plant caulis must be tied to the support. The support, therefore, can be used in wide variety of applications. Furthermore, when the support is sharpened at both ends, the support becomes well suited for positioning the support uprightly in the ground by piercing the support end into the earth.

The process for preparing the support according to the present invention is excellent in that a support having the advantages discussed above can be continuously prepared without difficulty and with good efficiency. Particularly, the first advantage is that the metal pipes and resin plugs can be surely alternately placed, and they can be continuously connected to form a continuum, which is subsequently subjected to a continuous extrusion covering, and thus the process can be carried out with increased efficiency. The second advantage is that one resin plug is interposed into the interval between the neighboring metal pipes to form the continuum, which is thereafter cut at the center of the resin plug to form a support having plugs at the both ends thereof, and it can be done simply and without difficulty to provide the metal pipes with plugs at each of their ends.

The present invention may be embodied in other specific forms without departing from the spirit or essential characteristics thereof. The presently disclosed embodiments are therefore to be considered in all respects as illustrative and nor restrictive, the scope of the invention being indicated by the appended claims, rather than the foregoing description, and all changes which come within the meaning and range of equivalency of the claims are, therefore, to be embraced therein.

We claim:

1. A process for preparing a support which includes metal pipes, resin plug means and resin tube means which comprises the steps of:
   (a) taking a single metal pipe one by one from a plurality of pipes piled with their longitudinal axes being positioned parallel to one another and to a passage;
   (b) taking a single a resin plug means one by one from a supply positioned in a direction transverse to the passage;
   (c) placing a first pipe in said passage;
   (d) intermittently transferring said first pipe in an axial direction and feeding another pipe into said passage with an interval being formed therebetween;
   (e) interposing one said plug means in the interval between the pipes with the plug means axis aligned with the axes of said pipes;
   (f) inserting each end of said plug means into corresponding ends of said pipes to form a continuum having a uniform diameter;
   (g) feeding the continuum into a cross-head die mounted on an extruder;
   (h) continuously covering the continuum with a synthetic resin; and
   (i) cutting the resin covered continuum at a portion where said plug means is present to produce a separate support.

2. The process as recited in claim 1, wherein taking up of said covered continuum is stopped intermittently while said extrusion covering is being applied.

3. The process as recited in claim 1, wherein spaced checks are provided on the passage wall at the exit in said cross-head die, thus forming a plurality of linear projections on the outer surface of said covered continuum, and further applying a jagged surface onto each of the projections to form local recesses on the projections while the projections are still in a softened state.

4. The process as recited in claim 1, wherein a position sensing switch is provided on the passage for said continuum, a saw means is driven by a sensed variation in the electro-magnetic waves between said metal pipe and said resin plug means detected by said position sensing switch, and said continuum is cut by said saw means at the position where said plug means is present in said continuum.

5. A process as recited in claim 1, wherein a position sensing switch is provided on a passage for said metal pipes and resin plug means, and said plug means are supplied one by one to said passage by the sensed variation in said electro-magnetic waves between said metal pipe and said resin plug means detected by said position sensing switch.

* * * * *